US012307191B2

(12) United States Patent
Botwick et al.

(10) Patent No.: US 12,307,191 B2
(45) Date of Patent: May 20, 2025

(54) IN-LINE LIVE DATA MENTIONS

(71) Applicant: Salesforce, Inc., San Francisco, CA (US)

(72) Inventors: Nathan Botwick, San Francisco, CA (US); Anuj Bheda, San Francisco, CA (US); Nikrad Mahdi, Oakland, CA (US); Justin Edmund, San Francisco, CA (US); Kyle Meyer, San Francisco, CA (US); Hieu Van Nguyen, San Ramon, CA (US); David Rapoport, San Francisco, CA (US); Jiaying Xu, San Francisco, CA (US); Thinh Van Lam, Dublin, CA (US); Bashar Al-Rawi, San Francisco, CA (US); Yunjie Ma, Oakland, CA (US); Oguz Demir, Amsterdam (NL); Melanie Matsuo, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/817,979

(22) Filed: Aug. 5, 2022

(65) Prior Publication Data

US 2023/0052809 A1 Feb. 16, 2023

Related U.S. Application Data

(60) Provisional application No. 63/231,586, filed on Aug. 10, 2021.

(51) Int. Cl.
*G06F 16/93* (2019.01)
*G06F 40/18* (2020.01)

(52) U.S. Cl.
CPC .............. *G06F 40/18* (2020.01); *G06F 16/93* (2019.01)

(58) Field of Classification Search
CPC ......... G06F 40/18; G06F 16/93; G06F 40/166
See application file for complete search history.

(56) References Cited

U.S. PATENT DOCUMENTS

2012/0221933 A1* 8/2012 Heiney .................. G06F 16/93 715/212
2013/0103741 A1* 4/2013 Palop .................... G06F 40/166 709/203
2014/0310608 A1* 10/2014 Snyder ............... G06Q 10/1095 715/738
2019/0138588 A1* 5/2019 Silk ......................... G06F 16/23
2021/0149992 A1* 5/2021 Nam ..................... G06F 40/169

* cited by examiner

*Primary Examiner* — Jennifer N Welch
*Assistant Examiner* — Amy P Hoang
(74) *Attorney, Agent, or Firm* — Holland & Hart LLP

(57) ABSTRACT

Methods, systems, and devices supporting data processing are described. In some systems, a user device may receive an indication to aviate an in-line view of a data record from a data platform that is external to a document editing client. A server running the document editing client may query the external data platform for a value of a field of the data record based on the received indication to activate the in-line view. The server, the user device, or both may cause the value to be displayed within the document editing client in an in-line position at which the indication to activate the in-line view is received.

16 Claims, 11 Drawing Sheets

205-a
205-b
External Data Platform
215
Document Editor
220
Test
225
Note let's plan for the System Fonts to be released Tomorrow
230
Test
Note let's plan for the System Fonts to be released Tomorrow
System Fonts
System Fonts
Project
Project Name
System Fonts
235
See All Fields
210
200

300-a 300-b 300-c

700

IN-LINE LIVE DATA MENTIONS

CROSS REFERENCE

The present Application for Patent claims the benefit of U.S. Provisional Patent Application No. 63/231,586 by BOTWICK et al., entitled "IN-LINE LIVE DATA MENTIONS," filed Aug. 10, 2021, assigned to the assignee hereof, and expressly incorporated herein.

FIELD OF TECHNOLOGY

The present disclosure relates generally to database systems and data processing, and more specifically to in-line live data mentions.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some systems may implement a collaboration tool with built-in functionality for word processing, spreadsheet, and presentation software. The tool may allow teams to work together on a set of documents. However, there may not be a way for a user of the collaboration tool to link a data record from a database system, such that aspects of the data record are displayed in a document.

DETAILED DESCRIPTION

Some systems may implement a collaboration tool with built-in functionality for word processing, spreadsheet, and presentation software. The tool may allow teams to work together on a set of documents. However, the collaboration tool may not support linking of a data record from the database system, such that aspects of the data record are displayed in an in-line position in a document.

As described herein, a server or service implementing the collaboration tool may provide in-line links to fields of a data record in a database system external to the document. For example, a user modifying a document in a document editing program may activate an in-line view of one or more fields of a data record by using a data mention (e.g., @ data record). The user may select which fields of the data record (e.g., if the data record is a person, the fields may be height, weight, and age) for the data platform editing program to display. The document editing program may receive an indication of the activation and may query a data platform for a value corresponding to a selected field of the data record. The program may cause the value to be displayed within the document editing program in an in-line position. For example, the value may be displayed in the document after the data mention, or may be displayed when a user clicks on the data mention, or the like. In some cases, the program may provide a method for the user to update the data record directly from the document implementing the collaboration tool, and may display the updated value to the user.

Aspects of the disclosure are initially described in the context of an environment supporting an on-demand database service. Additional aspects of the disclosure are described with reference to architecture diagrams, deployment diagrams, and process flows. Aspects of the disclosure are further illustrated by and described with reference to apparatus diagrams, system diagrams, and flowcharts that relate to in-line live data mentions.

Figure 1:
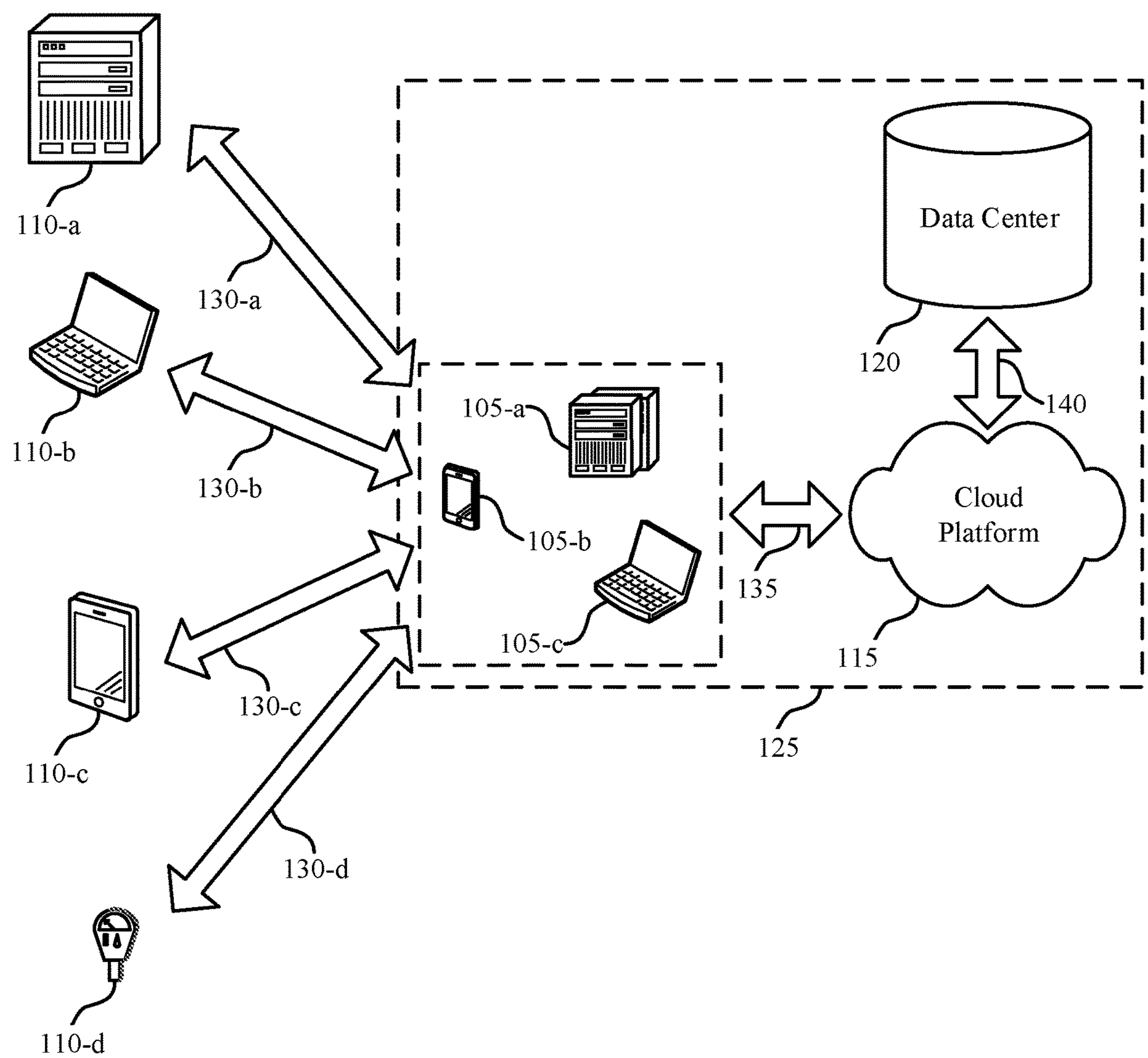
FIG. 1 illustrates an example of a data processing system that supports in-line live data mentions in accordance with aspects of the present disclosure.

FIG. 1 illustrates an example of a system 100 for cloud computing that supports in-line live data mentions in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, a user operating a user device, such as a cloud client 105, may access a document editing program, which may provide a platform to the user of the user device for collaborating with one or more other users. For example, the document editing program may be a collaboration tool with built-in functionality for word processing, spreadsheet, and presentation software. The document editing program may be linked to a data center 120, which may be an example of a database system external to the user device. In some examples, the collaboration tool may display a data record according to an expanded view of the data record within a document. However, displaying each field in the data record in a document may make viewing information (e.g., individual fields of the data record) difficult for the user of the user device or for one or more other users collaborating with the user.

As described herein, a user device may implement a method for data processing via which an in-line link to fields of a data record may be displayed to a user of the user device and one or more other users collaborating with the user. For example, the user may activate an in-line view of one or more fields of a data record by using a data mention, which may be activated by an ampersand (e.g., @ data record) or via another activation character or technique (e.g., right click). The user may search for a desired data record from a set of data records in an external data center 120. Each data record may have one or more fields from which the user may select. The user may select which fields of the data record for the document editing program to display. The value of each field may be displayed according to an in-line view in the document editing program (e.g., rather than displaying an entire data record in an expanded view). In some examples, the document editing program may query the external data center 120 to retrieve the values of each field. Similarly, the user may edit the fields of the data record by inputting a new value to the field, and the document editing program may query or otherwise communicate with the external data center 120 to update the value of the data record.

For example, a user may cause the document editing program to display one or more fields for a project using the data mention tool in a document editing program. The user may use @project to activate an in-line view of the project. The project may be a data record with one or more fields. The fields may include the name of the project, a category of the project, a version of the project, a team associated with the project, and the like. The user may select one or more of the fields to display in an in-line view of the document. Additionally, or alternatively, the user may update one or more fields (may add a new team member, may change the name of the project, etc.) within the document editing program. The document editing program may query an external data center 120 to retrieve the fields, update the fields, or both. The document editing program may display the values of each of the selected fields in an in-line view or using a spreadsheet interface.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
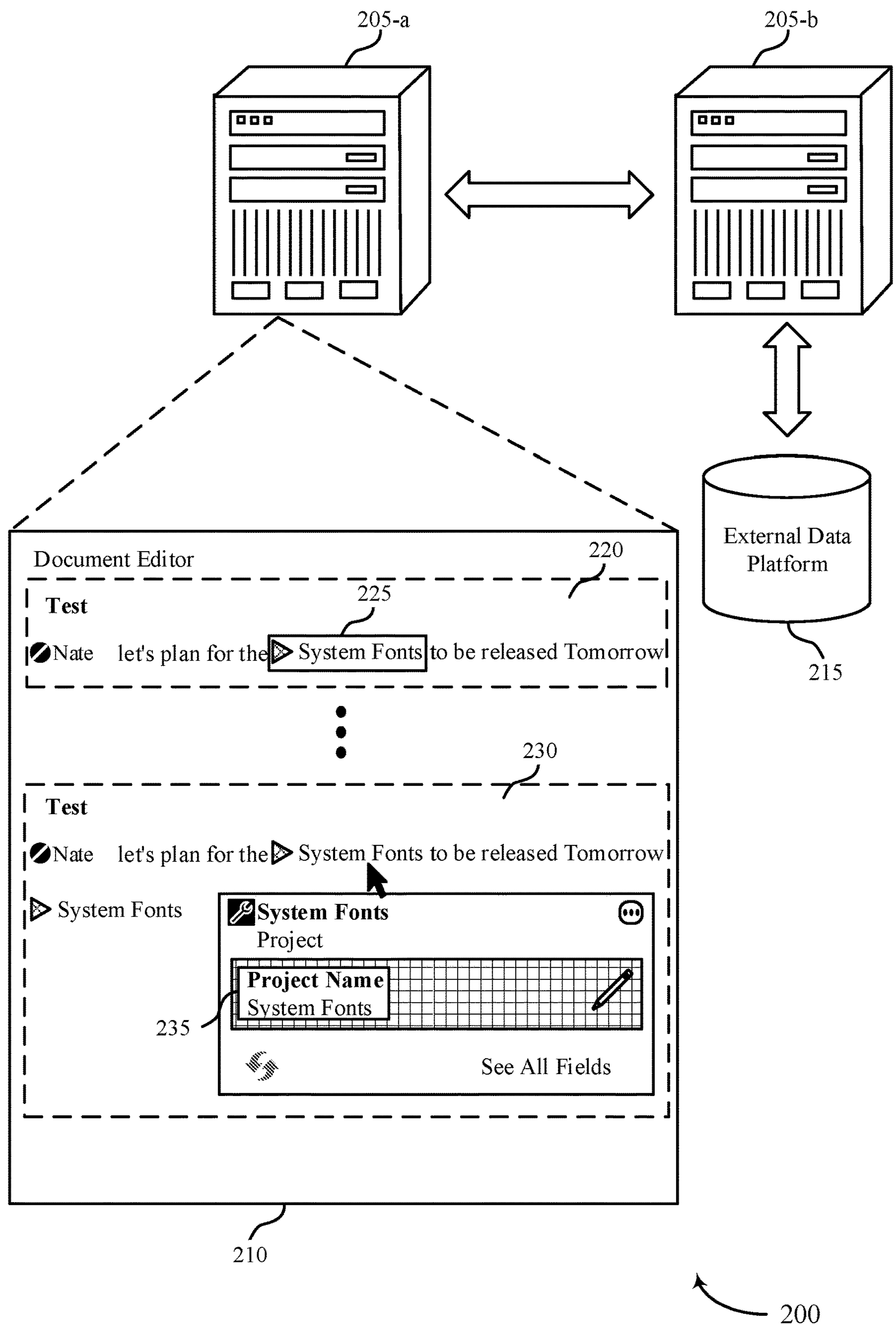
FIG. 2 illustrates an example of an architecture diagram that supports in-line live data mentions in accordance with aspects of the present disclosure.

FIG. 2 illustrates an example of an architecture diagram 200 that supports in-line live data mentions in accordance with aspects of the present disclosure. The architecture diagram 200 may include a server 205-*a* and a server 205-*b*, which may be processing components of a user device. Server 205-*a* and server 205-*b* may be an example of, or interface with, an application, an application server, a database server, a cloud-based server, a server cluster, a virtual machine, a container, or any combination of these or other devices or systems of devices. In some cases, a user device interfacing with server 205-*a* and server 205-*b* may be an example of a client device running a client application, such as a cloud client 105 as described with reference to FIG. 1. In some cases, server 205-*a* may support or execute a document editing program 210 that displays a value of a data record from an external data platform 215 according to an in-line view.

In some examples, at 220, server 205-*a* may receive an indication to activate an in-line view of a data record from an external data platform 215. The external data platform 215 may include multiple data records, each data record with one or more fields 235. The data records may be from a platform linked to document editing program 210, a third party platform, or both. The indication to activate the in-line view may be in the form of a live data mention 225 (e.g., @ mentioned) directly in a document editing program 210. For example, a user may include a live data mention 225 in-line in a document editing program 210 by using an ampersand and selecting a data record or project, such as system fonts, which is described in further detail with respect to FIGS. 3A through 4C. At 230, the document editing program 210 may display one or more fields 235 of the data record based on a queue from a user. For example, a user may move a mouse to hover over the data record, system fonts, which may cause the document editing program 210 to display the project name. In the example illustrated in FIG. 2, the project name is a field 235 of a "system fonts" data record, and "system fonts" may be the value of the project name field.

In some examples, typing the "@" character (or another character) may cause a set of selectable actions to be displayed, such as "Data Mention" (as described herein), "Contact Mention," "Date Mention," or the like. The user may select one of these options to display an in-line dynamic field. As described herein, selection of "Data Mention" and selection of the desired data record may cause the "@" to be replaced by a value of the selected data record, as shown at live data mention 225.

In some cases, data may flow between server 205-*a* and server 205-*b*. For example, a document editing program 210 may allow a user to access a value of a field 235, update a value of a field 235, or both from an external data platform 215. Thus, server 205-*a* may query the external data platform 215 via server 205-*b* (e.g., server 205-*a* may send a request (e.g., API request) for server 205-*b* to query the external data platform 215). In some cases, server 205-*a* may receive an input of a new value for one or more fields 235 from the document editing program 210. Server 205-*a* may query or otherwise communicate with the external data platform 215 to update the value of the data record at the external data platform 215 to the new value. For example, server 205-*a* may send the new value of the data record to server 205-*b*, and server 205-*b* may update the value in the external data platform 215.

Server 205-*a* and server 205-*b* may use one or more APIs (e.g., public APIs) to perform the queries (e.g., API calls). The calls may be made using hypertext transfer protocol secure (HTTPS). In some cases, server 205-*a*, server 205-*b*, or both may perform client encryption based on a local operating system (OS) secure storage mechanism. Additionally, or alternatively, there may be an additional encryption layer on top of the local database. The fields of the data records may be synced between a local client database for the document editing program 210 and the external data platform 215. Thus, a copy of a document from the document editing program 210 and one or more data records mentioned in that document, such as data mentions 225, may be stored locally (e.g., in addition to at the external data platform 215). For the document editing program 210 to display the document and the content including the data mentions 225, the local clients may store a copy of the document data. However, through various syncing mechanisms, users with access to the document may have the data synced. If one or more users lose access to the document, the document data may be cleared from the local client. Additionally, or alternatively, server 205-*a*, server 205-*b*, or both may sync the record data and metadata between the external data platform 215 and a local database.

In some cases, if there is a change to a data record, such as Record A, server 205-*a* may send a change event to server 205-*b* through a change data capture (CDC) stream (e.g., using the integration user's permissions). Server 205-*b* may then query the external data platform 215 using credentials, such that Record A's updated data using the permissions may be updated on server 205-*b*. The query may trigger an update of the data record stored in the external data platform 215. An update to Record A may be synced to a local database of server 205-*a*. In some other cases, if there is a change to a data record, such as Record B, but no user has mentioned Record B in an external data platform 215, server 205-*a* may still send a change event to server 205-*b*, but server 205-*b* may ignore the event. In some other examples, if there is a change to a data record, such as Record C, which may be an object that an integration user may not have access to, then server 205-*a* may not send a change event to server 205-*b*.

In some cases, one or more data records may be shared between multiple databases, such as multiple external data platforms 215. Each database may have replicas for efficient reads, which may be in sync with a primary database. If a data record is deleted on a primary external data platform 215, the data record may be deleted on the replicas as well. If a connection between server 205-*a* and server 205-*b* is terminated, data may remain in both the external data platform 215 and local databases of server 205-*a* to support document version control. However, the data may be cleared from a client device, and an end user may no longer see the record data. When server 205-*b* deletes a data record in external data platform 215 (e.g., independent of the document editing program 210 running at server 205-*a*), the data record may be cleared from a client device, and an end user may no longer see the record data. The end user may instead see an error related to the record being deleted at the external data platform 215. In some cases, server 205-*a*, server 205-*b*, or both may periodically check whether data records are not deleted in external data platform 215 via queries, API calls, or other communication techniques.

Figure 3A:
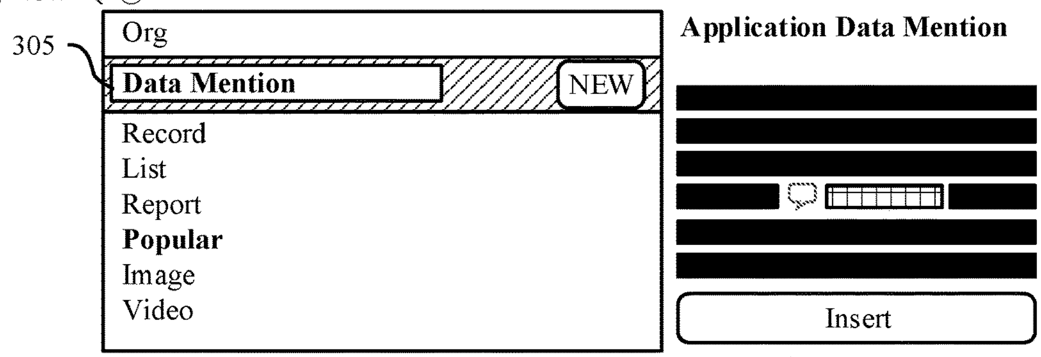
FIGS. 3A through 4C illustrate examples of deployment diagrams that support in-line live data mentions in accordance with aspects of the present disclosure.
Figure 3B:
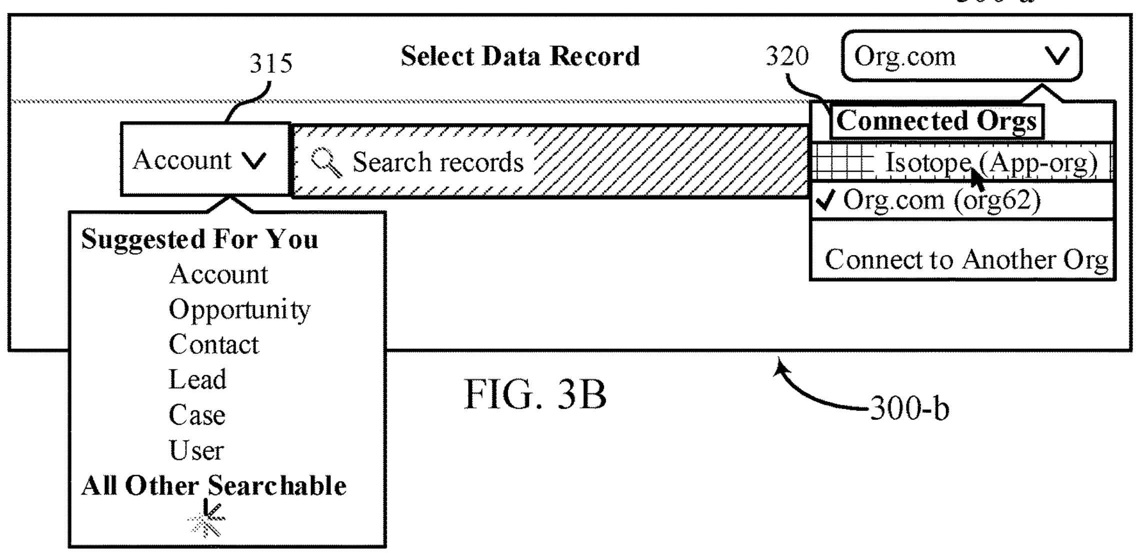
Figure 3C:
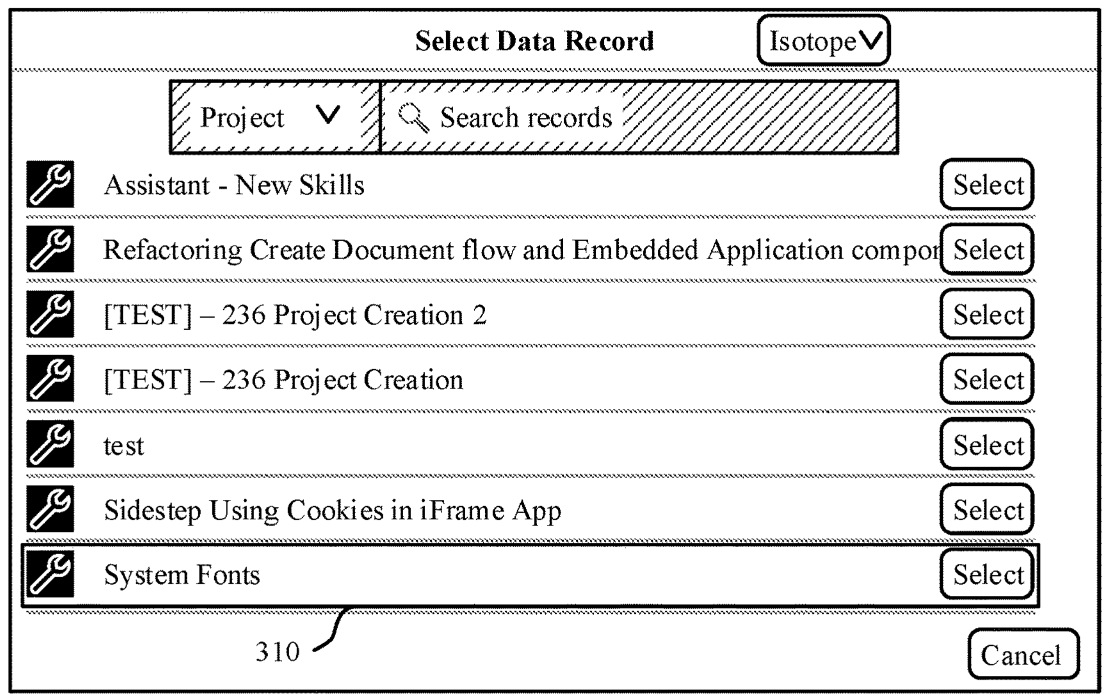

FIGS. 3A through 3C illustrate examples of deployment diagrams 300 that support in-line live data mentions in accordance with aspects of the present disclosure. Deployment diagram 300-*a* through deployment diagram 300-*c* may be supported or implemented by aspects of architecture diagram 200 as described with reference to FIG. 2. For example, a server supporting a user device, such as a server 205 as described with reference to FIG. 2, may deploy a document editing program that may display a value of a data record in an in-line view for a user of the user device. Deployment diagram 300-*a* may illustrate an example of a document editing client receiving an activation of a data mention 305. Deployment diagram 300-*b* may illustrate an example of searching for a data record 310 once the data mention 305 is activated. Deployment diagram 300-*c* may illustrate an example of data record 310 selection based on searching for the data record 310.

In some examples, a document editing client running a document editing program may receive an indication to activate an in-line view of a data record 310. For example, as illustrated with respect to FIG. 3A, a user of a user device may add a data mention 305 to a document using the document editing program. The user may activate the data mention 305 by entering an ampersand (or another character) and selecting a data mention 305 to input to the document. The data mention 305 may allow the document editing program to display one or more values from a data record on a per field basis according to an in-line position in a document. In some cases, a user may know the name of the data record, and may call the data record out directly by using the data mention 305 (e.g., @ data record name). In some other cases, the user may search for the data record 310 from a database using an interface component.

In some examples, as illustrated with respect to FIG. 3B, the document editing program may allow the user to search for a data record based on an object 315 (or a category) and a connected organization 320. The object 315 and connected organization 320 may indicate to a server from which external data platform to pull the data record from. For example, a user may select an isotope organization (e.g., corresponding to an external data platform associated with the "isotope" organization), and a set of objects may be displayed for selection. In some examples, in response to selection of the organization/external data platform, the external data platform may be queried for the set of objects for display for selection by the user. The user may select an object 315. The object 315 (e.g., account object) of isotope organization 320 may include a set of data records 310 stored at an external data platform. In FIG. 3C, the user has selected a "Project" object, and a set of data records corresponding to the Project object are displayed, such as a system fonts data record 310. As illustrated with respect to FIG. 3C, the user may select a data record 310, such as system fonts, based on searching (e.g., filtering) for the data records 310 according to the object 315 and the connected organization 320.

Techniques are described herein with respect to using an ampersand (e.g., "@") character to activate in-line live data mentions. It should be understood that other characters may be used to activate in-line live data mentions. It should also be understood that other techniques for activating in-line live data mentions may be used, such as by right-clicking (or otherwise selecting) in a desired line and location to activate a UI component.

Figure 4A:
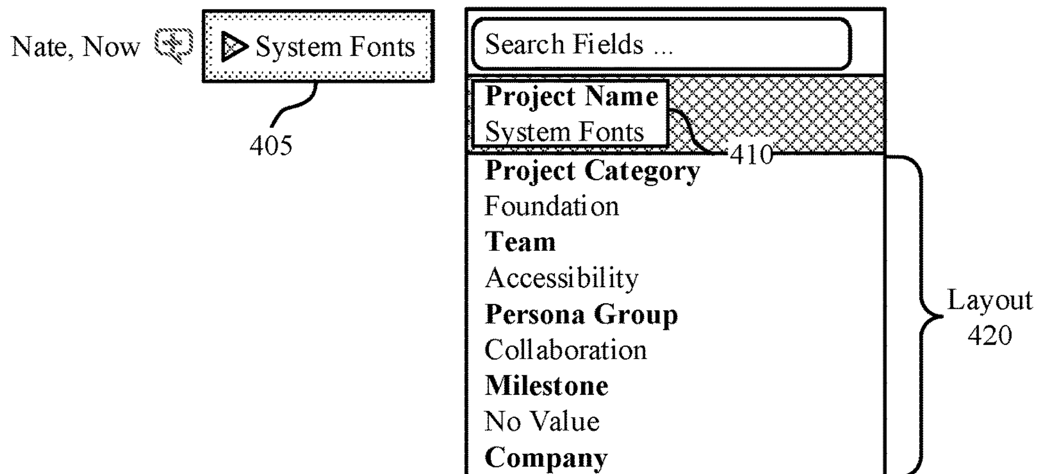
Figure 4B:
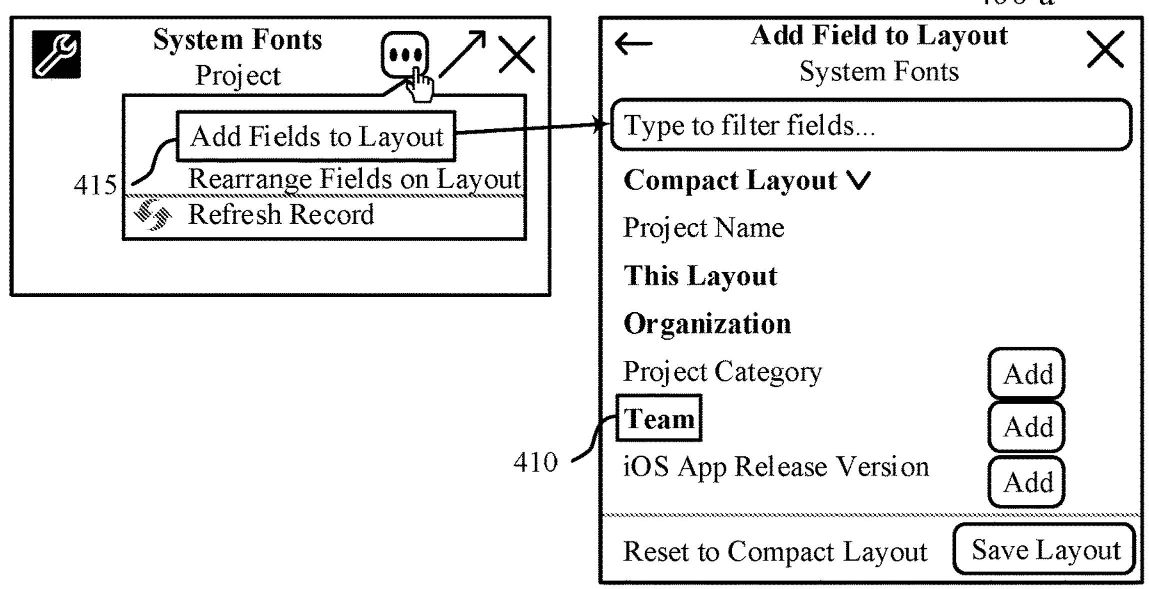
Figure 4C:
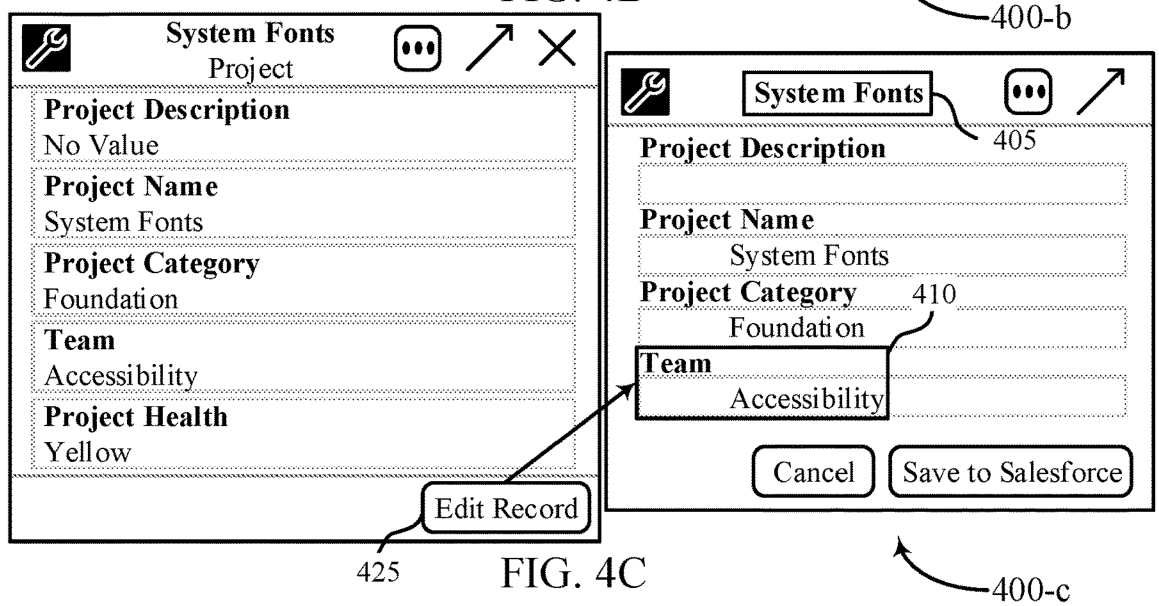

FIGS. 4A through 4C illustrate examples of deployment diagrams 400 that support in-line live data mentions in accordance with aspects of the present disclosure. Deployment diagram 400-*a* through deployment diagram 400-*c* may implement aspects of architecture diagram 200, deployment diagram 300-*a* through deployment diagram 300-*c*, or both as described with reference to FIGS. 2 and 3. For example, a server supporting a user device, such as a server 205 as described with reference to FIG. 2, may deploy a document editing program that may display a value of a data record in an in-line view for a user of the user device. Once a user selects a data record 405 as described with respect to FIGS. 3A through 3C, the user may select a field of the data record 405 such that a value of the field is displayed. For example, deployment diagram 400-*a* may illustrate an example of searching for a field of a data record 405 once a data mention is activated in a document editing program. Deployment diagram 300-*b* may illustrate an example of adding one or more fields of the data record to optionally be displayed. Deployment diagram 300-*c* may illustrate an example of a user updating a value of a field of the data record through the document editing program.

In some examples, a document editing client running a document editing program may receive an indication to activate an in-line view of a data record 405. For example, a user of a user device may add a data mention to a document using the document editing program. The data mention may allow the document editing program to display one or more values from a data record 405 on a per field basis according to an in-line position in a document. For example, as illustrated with respect to FIG. 3A, the document editing program may allow the user to search for and add one or more fields 410 to be displayed in the document. A data record 405 may have one or more fields 410, which may each have a value. For example, a system fonts data record 405 may have a title, a project category, a team, a persona group, a milestone, a company etc. that may each be a field 410 of the data record 405. The respective value of each of the fields 410 may be system fonts, foundation, accessibility, collaboration, no value, etc. for the data record 405. In some cases, the document editing program may allow a user to display one or more values of one or more fields 410 in-line in a document. For example, a document editing client may query an external data platform for a value of a field 410 based on a user activating the data mention for a data record 405. A user device may display the value in an in-line position at which the indication to activate the in-line view is received (e.g., where the data mention displays the data record 405).

In some examples, as illustrated with respect to FIG. 4B, the document editing program may allow the user to add one or more fields 410 to the drop-down menu for the user to select from. For example, a user may select an option to add fields 410, such as by clicking an add fields to layout button 415. The document editing program may query an external database for a set of objects, or fields 410, of a tenant of the document editing program. The user device may cause an indication of the set of objects, or fields 410, to be displayed for the user to select to add to a fields layout 420 (e.g., a list of fields 410 to be displayed in-line at the document). In some cases, the user may add one or more fields 410 to the layout 420 based on the query to the external database. Once the fields 410 are added to the layout 420, the user may select one or more fields 410 of which the values may be displayed within a document editing client in an in-line position.

In some cases, as illustrated with respect to FIG. 4C, the document editing program may allow the user to update a value of a field 410 for a data record 405. For example, a user may prompt the document editing program to edit a data record 405 by using an edit record button 425. In some examples, the edit record button 425 may cause the document editing program to display a window at the user device in which a user may update a value of a field 410. For example, a user may input a new value for the data record 405 at a document editing client. A server running the document editing client may query (and/or transmits an API request to) an external data platform to update the value of the data record 405 at the external data platform.

Figure 5:
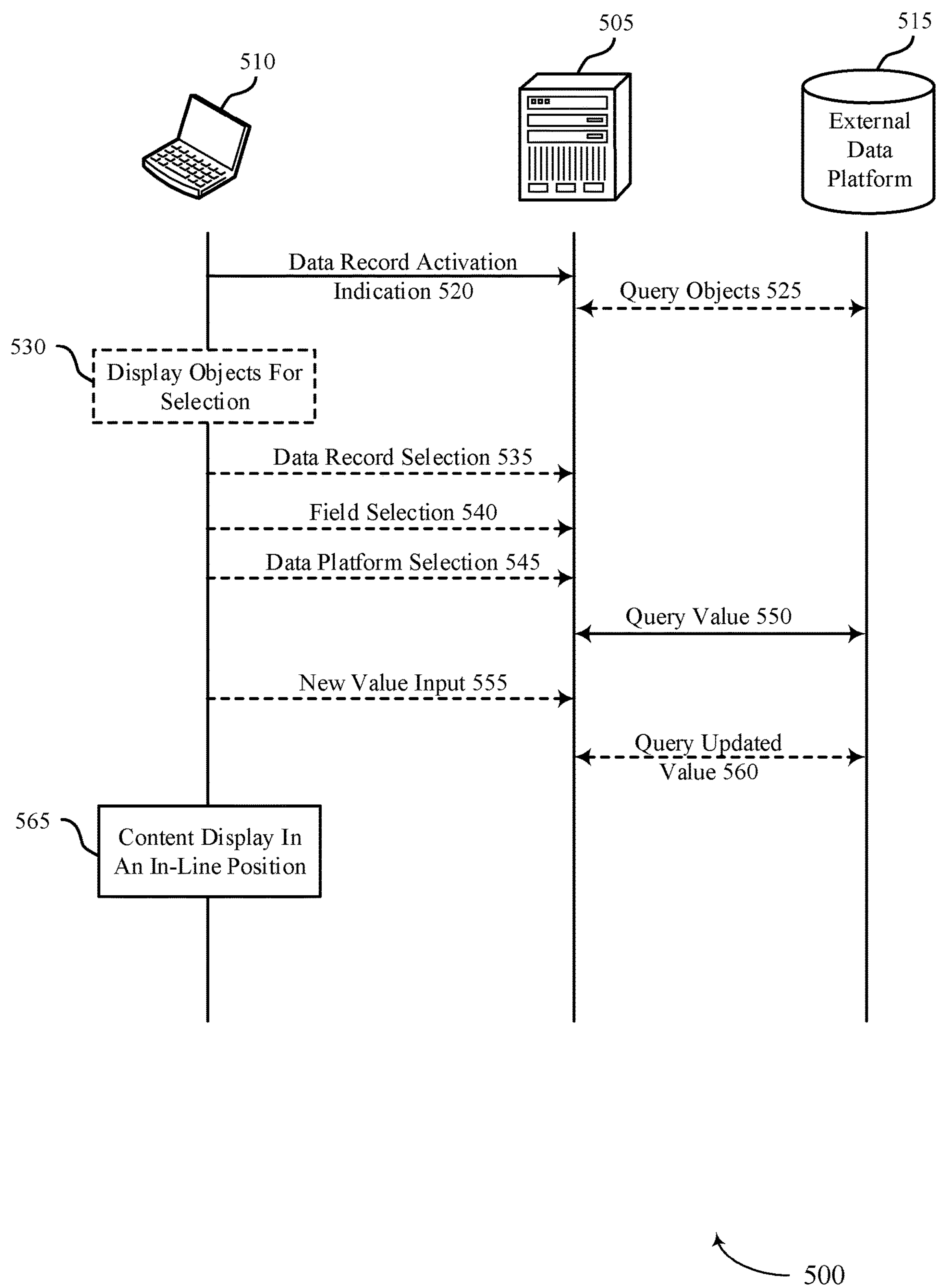
FIG. 5 illustrates an example of a process flow that supports in-line live data mentions in accordance with aspects of the present disclosure.

FIG. 5 illustrates an example of a process flow 500 that supports in-line live data mentions in accordance with aspects of the present disclosure. In some examples, process flow 500 may implement aspects of architecture diagram 200, deployment diagrams 300, and deployment diagrams 400. The process flow 500 may include a server 505, which may be an example of a server 205 as described with reference to FIG. 2, receiving a data record activation indication from a user device 510. The data record activation indication may cause a value from an external data platform

515 to be displayed within a document editing client in an in-line position at the user device 510. Alternative examples of the following may be implemented, where some processes are performed in a different order than described or are not performed. In some cases, processes may include additional features not mentioned below, or further processes may be added.

At 520, the user device 510 may send a data record activation indication to a server 505. For example, a document editing client at server 505 may receive an indication to activate an in-line view of a data record from a data platform that is external to the document editing client (e.g., external data platform 515).

At 525, the server 505 may query an external data platform 515 for a set of objects. For example, the server 505 may query the external data platform 515 based on the received indication to activate the in-line view. The set of objects may be for a tenant running at the document editing client. In some cases, the external data platform may be a relational database, a GitHub repository, a data lake, or a combination thereof.

At 530, the user device 510 may cause an indication of the set of objects to be displayed for selection at the document editing client.

At 535, the user device 510 may send a selection of a data record to the server 505 based on causing the indication of the set of objects to be displayed. For example, the user device may select an object of the set of objects, and the object may be the data record.

At 540, the user device 510 may send a selection of a field of the data record to the server 505. The value may be the value of the field (e.g., if the field is a team, the value may be which team the data record belongs to). The data record may have multiple fields.

At 545, the user device 510 may send a selection of an external data platform 515 to a document editing client running at the server 505. The document editing client may interface with multiple external data platforms, and the external data platform 515 may be one of the multiple external data platforms.

At 550, the server 505 may query the external data platform 515 for a value of the data record based on the received indication to activate the in-line view. For example, the server 505 may transmit an application programming interface request to the external data platform. In some cases, the value may be queried based on receiving the selection of the field. Additionally, or alternatively, the external data platform may be queried for the value based on receiving the selection of the external data platform.

At 555, the user device 510 may transmit an input including a new value for the data record to a document editing client at the server 505.

At 560, the server 505 may query the external data platform 515 to update the value of the data record at the external data platform 515 to the new value based on receiving the input comprising the new value.

At 565, the user device 510, the server 505, or both may cause the value to be displayed within the document editing client in an in-line position at which the indication to activate the in-line view is received. The value may be displayed based on receiving the selection of the data record. In some cases, the value may be displayed without a record title for the data record, without additional information of the data record, or both (e.g., without an expanded view of the data record). The document editing client may be supported by a tenant instance of a multi-tenant system, and the external data platform 515 may be linked to the document editing client by the tenant instance of the multi-tenant system. In some cases, the in-line view may be a view of the value within a line of plain text.

Figure 6:
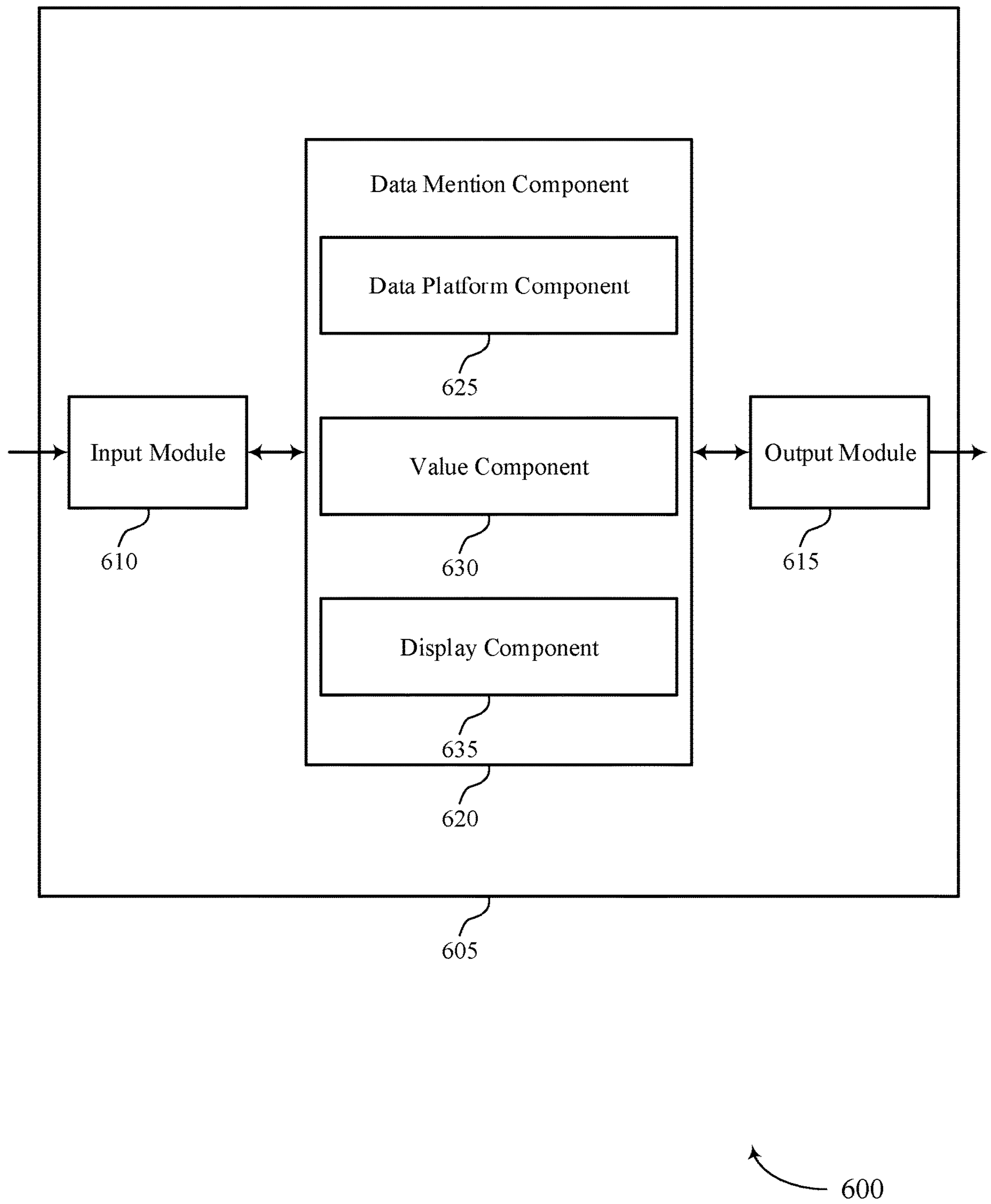
FIG. 6 shows a block diagram of an apparatus that supports in-line live data mentions in accordance with aspects of the present disclosure.

FIG. 6 shows a block diagram 600 of a device 605 that supports in-line live data mentions in accordance with aspects of the present disclosure. The device 605 may include an input module 610, an output module 615, and a data mention component 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the data mention component 620 to support in-line live data mentions. In some cases, the input module 610 may be a component of an I/O controller 810 as described with reference to FIG. 8.

The output module 615 may manage output signals for the device 605. For example, the output module 615 may receive signals from other components of the device 605, such as the data mention component 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the data mention component 620 may include a data platform component 625, a value component 630, a display component 635, or any combination thereof. In some examples, the data mention component 620, or various components thereof, may be configured to perform various operations (e.g., receiving, monitoring, transmitting) using or otherwise in cooperation with the input module 610, the output module 615, or both. For example, the data mention component 620 may receive information from the input module 610, send information to the output module 615, or be integrated in combination with the input module 610, the output module 615, or both to receive information, transmit information, or perform various other operations as described herein.

The data mention component 620 may support data processing in accordance with examples as disclosed herein. The data platform component 625 may be configured as or otherwise support a means for receiving, at a document editing client, an indication to activate an in-line view of a data record from a data platform that is external to the document editing client. The value component 630 may be configured as or otherwise support a means for querying, based at least in part on the received indication to activate the in-line view, the external data platform for a value corresponding to the data record. The display component 635 may be configured as or otherwise support a means for causing the value to be displayed within the document editing client in an in-line position at which the indication to activate the in-line view is received.

Figure 7:
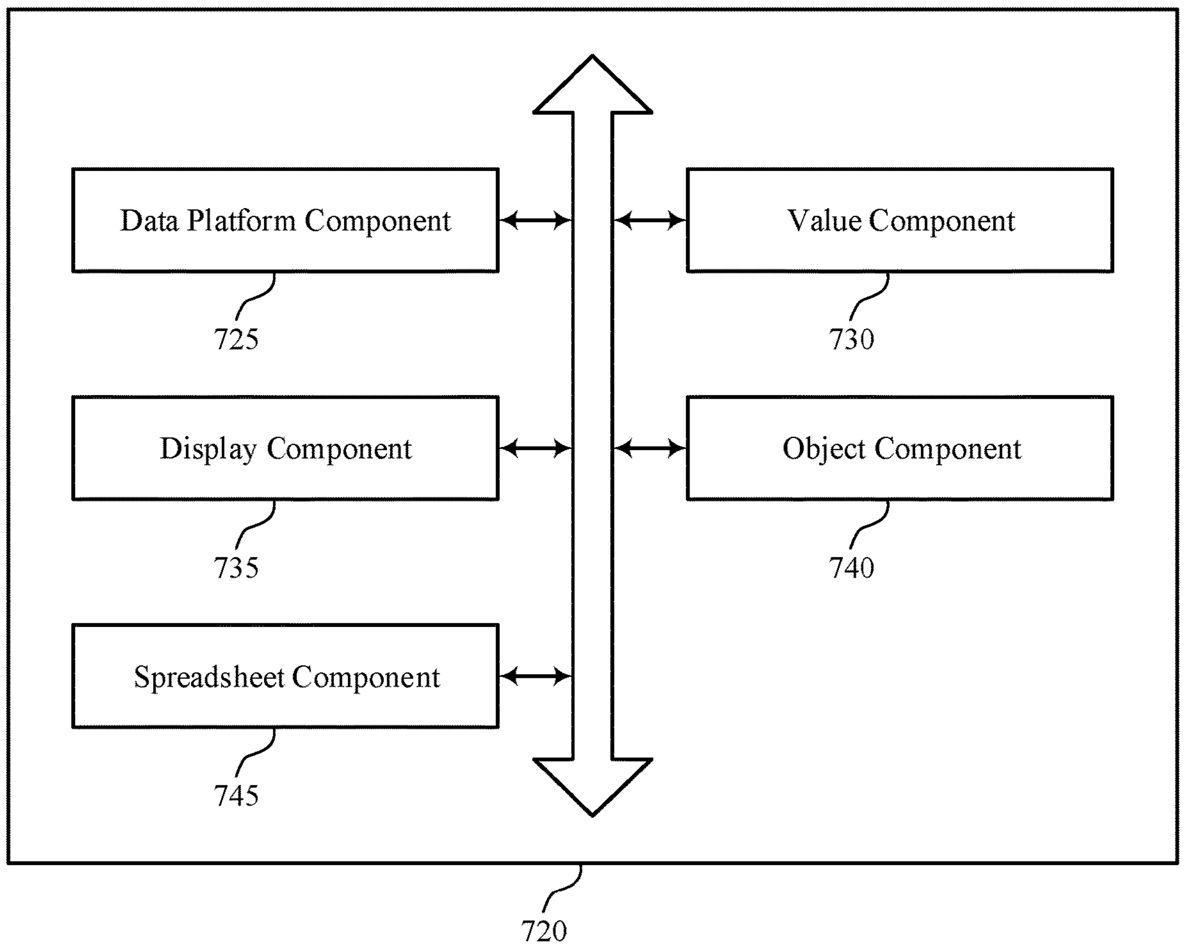
FIG. 7 shows a block diagram of a data mention component that supports in-line live data mentions in accordance with aspects of the present disclosure.

FIG. 7 shows a block diagram 700 of a data mention component 720 that supports in-line live data mentions in accordance with aspects of the present disclosure. The data mention component 720 may be an example of aspects of a data mention component or a data mention component 620, or both, as described herein. The data mention component 720, or various components thereof, may be an example of means for performing various aspects of in-line live data mentions as described herein. For example, the data mention component 720 may include a data platform component 725, a value component 730, a display component 735, an object component 740, a spreadsheet component 745, or any combination thereof. Each of these components may communicate, directly or indirectly, with one another (e.g., via one or more buses).

The data mention component 720 may support data processing in accordance with examples as disclosed herein. The data platform component 725 may be configured as or otherwise support a means for receiving, at a document editing client, an indication to activate an in-line view of a data record from a data platform that is external to the document editing client. The value component 730 may be configured as or otherwise support a means for querying, based at least in part on the received indication to activate the in-line view, the external data platform for a value corresponding to the data record. The display component 735 may be configured as or otherwise support a means for causing the value to be displayed within the document editing client in an in-line position at which the indication to activate the in-line view is received.

In some examples, the data platform component 725 may be configured as or otherwise support a means for querying, based at least in part on the received indication to activate the in-line view, the external data platform for a set of objects associated with a tenant corresponding to the document editing client. In some examples, the display component 735 may be configured as or otherwise support a means for causing an indication of the set of objects to be displayed for selection at the document editing client. In some examples, the object component 740 may be configured as or otherwise support a means for receiving, based at least in part on causing the indication of the set of objects to be displayed, a selection of the data record that corresponds an object of the set of objects, wherein the value corresponding to the data record is displayed based at least in part on receiving the selection of the data record.

In some examples, the value component 730 may be configured as or otherwise support a means for receiving a selection of a field of the data record associated with the value from a plurality of fields of the data record, wherein the value is queried based at least in part on receiving the selection of the field.

In some examples, the value component 730 may be configured as or otherwise support a means for receiving, at the document editing client, an input comprising a new value for the data record. In some examples, the data platform component 725 may be configured as or otherwise support means for querying, based at least in part on receiving the input comprising the new value, the external data platform to update the value of the data record at the external data platform to the new value.

In some examples, to support causing the value to be displayed within the document editing client, the display component 735 may be configured as or otherwise support a means for causing the value to be displayed without a record title corresponding to the data record, without additional information corresponding to the data record, or both.

In some examples, to support causing the value to be displayed within the document editing client, the spreadsheet component 745 may be configured as or otherwise support a means for causing a spreadsheet interface with one or more fields to be displayed, wherein the value is a field of the one or more fields within the spreadsheet interface.

In some examples, the external data platform is a relational database, a GitHub repository, a data lake, or a combination thereof.

In some examples, the data platform component 725 may be configured as or otherwise support a means for receiving, at the document editing client, a selection of an external data platform of a plurality of external data platforms associated with the document editing client, wherein the external data platform is queried for the value based at least in part on receiving the selection of the external data platform.

In some examples, the document editing client is supported by tenant instance of a multi-tenant system and the external data platform is linked to the document editing client by the tenant instance of the multi-tenant system.

In some examples, the in-line view corresponds to a view of the value within a line of plain text.

In some examples, to support querying the external data platform, the data platform component 725 may be configured as or otherwise support a means for transmitting, to the external data platform, an application programming interface request.

Figure 8:
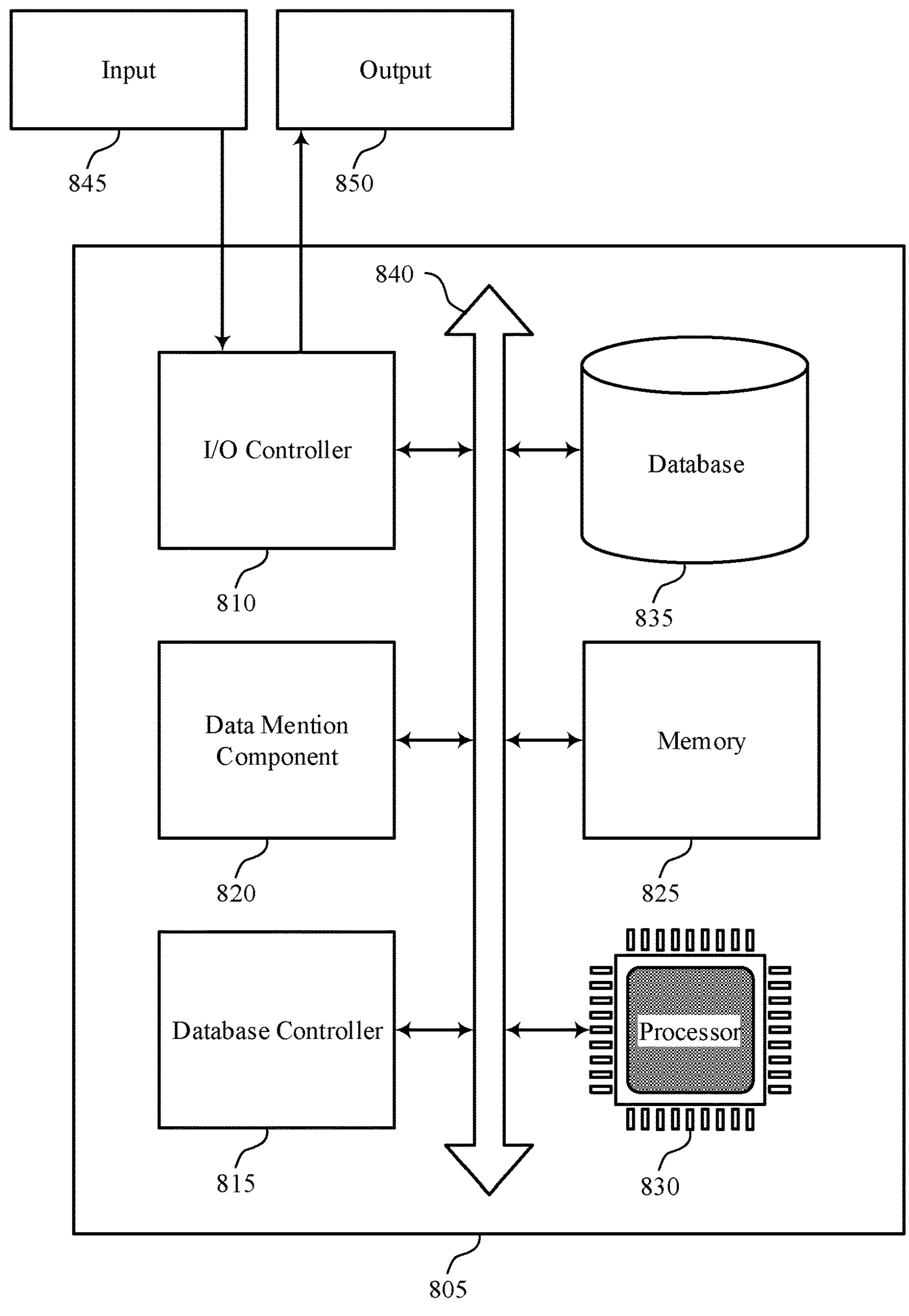
FIG. 8 shows a diagram of a system including a device that supports in-line live data mentions in accordance with aspects of the present disclosure.

FIG. 8 shows a diagram of a system 800 including a device 805 that supports in-line live data mentions in accordance with aspects of the present disclosure. The device 805 may be an example of or include the components of a device 605 as described herein. The device 805 may include components for bi-directional data communications including components for transmitting and receiving communications, such as a data mention component 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may contain, among other things, a basic I/O system (BIOS) which may control basic hardware or software operation such as the interaction with peripheral components or devices.

The processor 830 may include an intelligent hardware device, (e.g., a general-purpose processor, a digital signaling processor (DSP), a central processing unit (CPU), a microcontroller, an application-specific integrated circuit (ASIC), a field-programmable gate-array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting in-line live data mentions).

The data mention component 820 may support data processing in accordance with examples as disclosed herein. For example, the data mention component 820 may be configured as or otherwise support a means for receiving, at a document editing client, an indication to activate an in-line view of a data record from a data platform that is external to the document editing client. The data mention component 820 may be configured as or otherwise support a means for querying, based at least in part on the received indication to activate the in-line view, the external data platform for a value corresponding to the data record. The data mention component 820 may be configured as or otherwise support a means for causing the value to be displayed within the document editing client in an in-line position at which the indication to activate the in-line view is received.

By including or configuring the data mention component 820 in accordance with examples as described herein, the device 805 may support techniques for a document editing client to display a value of a data record in an in-line position in a document, which may improve user experience among other advantages.

Figure 9:
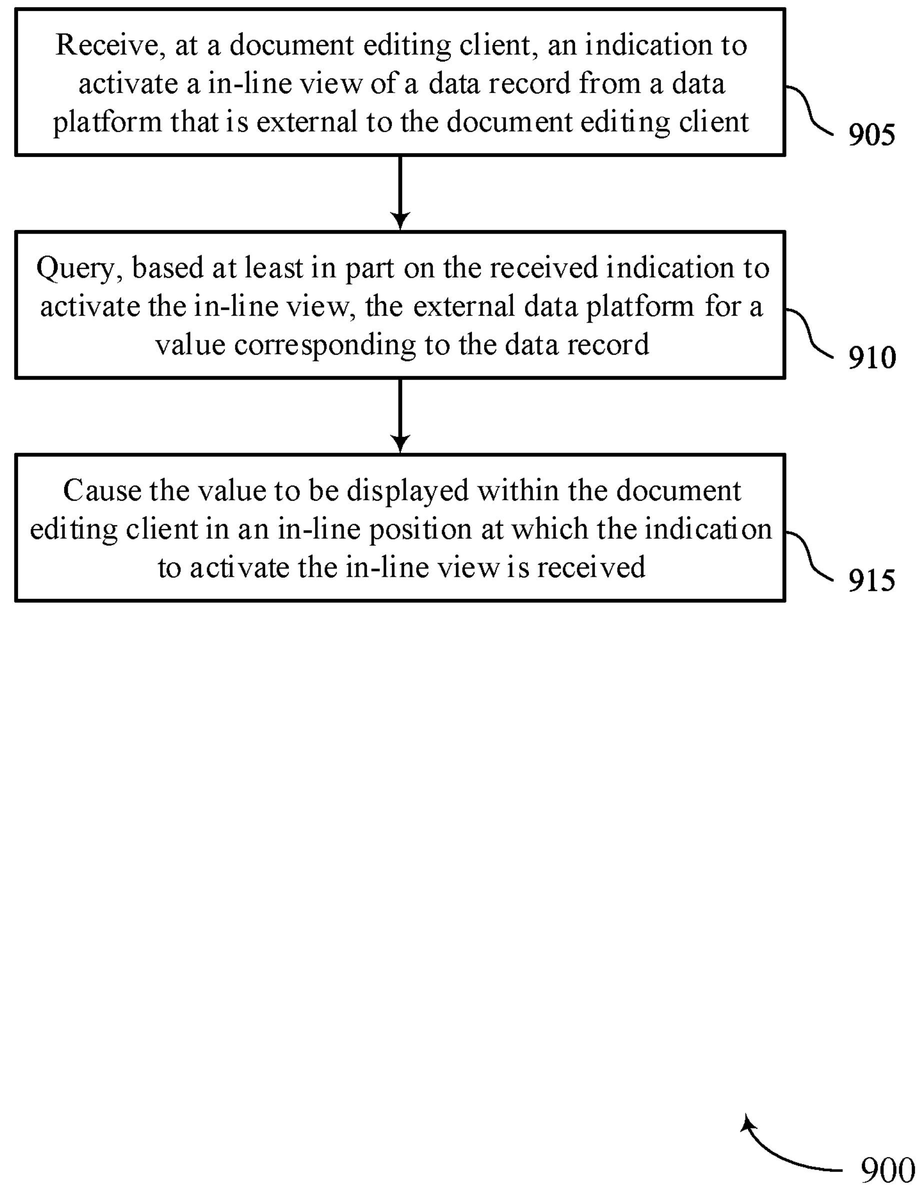
FIGS. 9 through 11 show flowcharts illustrating methods that support in-line live data mentions in accordance with aspects of the present disclosure.

FIG. 9 shows a flowchart illustrating a method 900 that supports in-line live data mentions in accordance with aspects of the present disclosure. The operations of the method 900 may be implemented by a server, user device, or a combination thereof or its components as described herein. For example, the operations of the method 900 may be performed by a server, user device, or a combination thereof as described with reference to FIGS. 1 through 8. In some examples, a server, user device, or a combination thereof may execute a set of instructions to control the functional elements of the server, user device, or a combination thereof to perform the described functions. Additionally, or alternatively, the server, user device, or a combination thereof may perform aspects of the described functions using special-purpose hardware.

At 905, the method may include receiving, at a document editing client, an indication to activate an in-line view of a data record from a data platform that is external to the document editing client. The operations of 905 may be performed in accordance with examples as disclosed herein. In some examples, aspects of the operations of 905 may be performed by a data platform component 725 as described with reference to FIG. 7.

At 910, the method may include querying, based at least in part on the received indication to activate the in-line view, the external data platform for a value corresponding to the data record. The operations of 910 may be performed in accordance with examples as disclosed herein. In some examples, aspects of the operations of 910 may be performed by a value component 730 as described with reference to FIG. 7.

At 915, the method may include causing the value to be displayed within the document editing client in an in-line position at which the indication to activate the in-line view is received. The operations of 915 may be performed in accordance with examples as disclosed herein. In some examples, aspects of the operations of 915 may be performed by a display component 735 as described with reference to FIG. 7.

Figure 10:
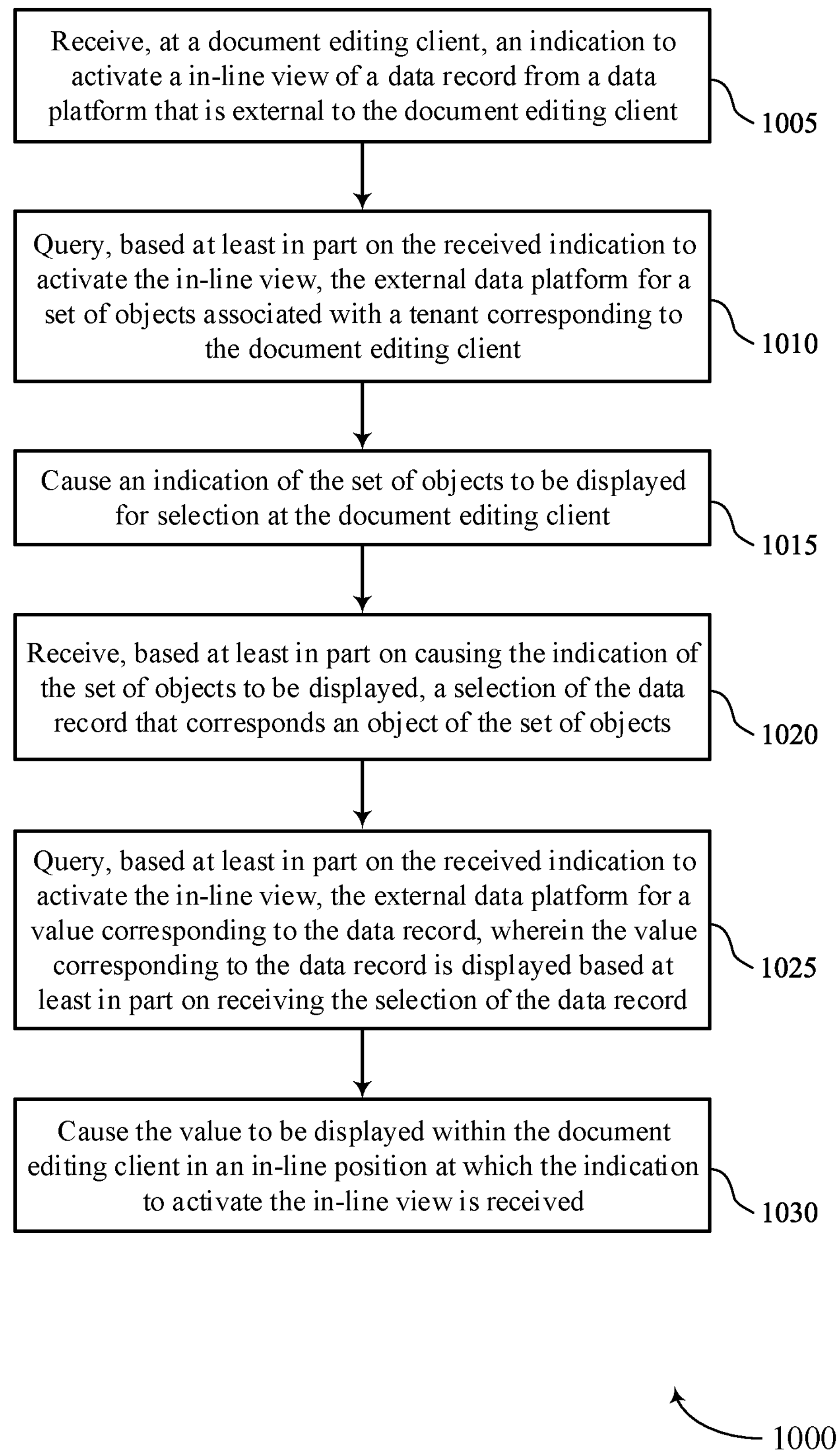

FIG. 10 shows a flowchart illustrating a method 1000 that supports in-line live data mentions in accordance with aspects of the present disclosure. The operations of the method 1000 may be implemented by a server, user device, or a combination thereof or its components as described herein. For example, the operations of the method 1000 may be performed by a server, user device, or a combination thereof as described with reference to FIGS. 1 through 8. In some examples, a server, user device, or a combination thereof may execute a set of instructions to control the functional elements of the server, user device, or a combination thereof to perform the described functions. Additionally, or alternatively, the server, user device, or a combination thereof may perform aspects of the described functions using special-purpose hardware.

At 1005, the method may include receiving, at a document editing client, an indication to activate an in-line view of a data record from a data platform that is external to the document editing client. The operations of 1005 may be performed in accordance with examples as disclosed herein. In some examples, aspects of the operations of 1005 may be performed by a data platform component 725 as described with reference to FIG. 7.

At 1010, the method may include querying, based at least in part on the received indication to activate the in-line view, the external data platform for a set of objects associated with a tenant corresponding to the document editing client. The operations of 1010 may be performed in accordance with examples as disclosed herein. In some examples, aspects of the operations of 1010 may be performed by a data platform component 725 as described with reference to FIG. 7.

At 1015, the method may include causing an indication of the set of objects to be displayed for selection at the document editing client. The operations of 1015 may be performed in accordance with examples as disclosed herein. In some examples, aspects of the operations of 1015 may be performed by a display component 735 as described with reference to FIG. 7.

At 1020, the method may include receiving, based at least in part on causing the indication of the set of objects to be displayed, a selection of the data record that corresponds an object of the set of objects. The operations of 1020 may be performed in accordance with examples as disclosed herein. In some examples, aspects of the operations of 1020 may be performed by an object component 740 as described with reference to FIG. 7.

At 1025, the method may include querying, based at least in part on the received indication to activate the in-line view, the external data platform for a value corresponding to the data record. The operations of 1025 may be performed in accordance with examples as disclosed herein. In some examples, aspects of the operations of 1025 may be performed by a value component 730 as described with reference to FIG. 7.

At 1030, the method may include causing the value to be displayed within the document editing client in an in-line position at which the indication to activate the in-line view is received, wherein the value corresponding to the data record is displayed based at least in part on receiving the selection of the data record. The operations of 1030 may be performed in accordance with examples as disclosed herein. In some examples, aspects of the operations of 1030 may be performed by a display component 735 as described with reference to FIG. 7.

Figure 11:
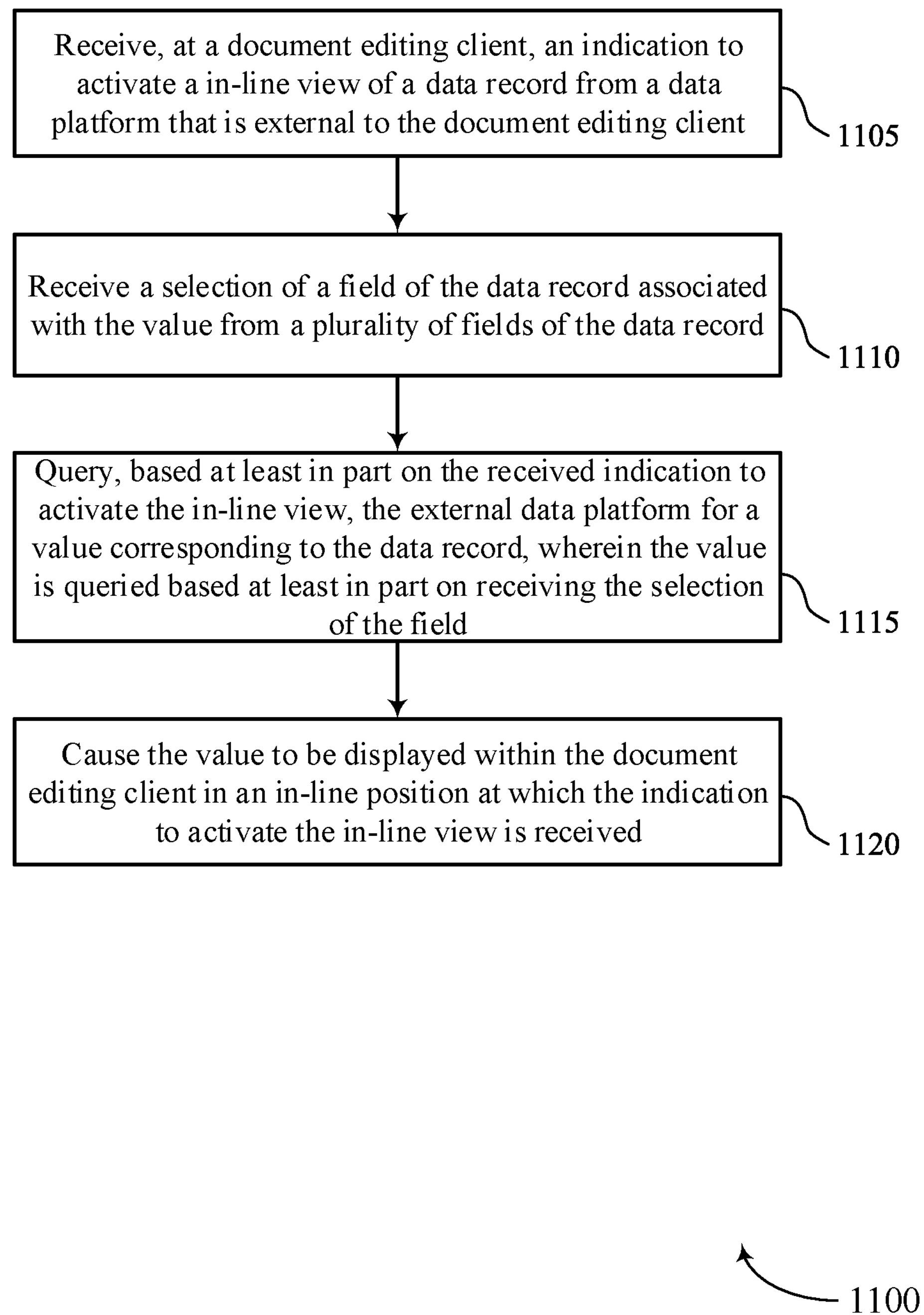

FIG. 11 shows a flowchart illustrating a method 1100 that supports in-line live data mentions in accordance with aspects of the present disclosure. The operations of the method 1100 may be implemented by a server, user device, or a combination thereof or its components as described herein. For example, the operations of the method 1100 may be performed by a server, user device, or a combination thereof as described with reference to FIGS. 1 through 8. In some examples, a server, user device, or a combination thereof may execute a set of instructions to control the functional elements of the server, user device, or a combination thereof to perform the described functions. Additionally, or alternatively, the server, user device, or a combination thereof may perform aspects of the described functions using special-purpose hardware.

At 1105, the method may include receiving, at a document editing client, an indication to activate an in-line view of a data record from a data platform that is external to the document editing client. The operations of 1105 may be performed in accordance with examples as disclosed herein. In some examples, aspects of the operations of 1105 may be performed by a data platform component 725 as described with reference to FIG. 7.

At 1110, the method may include receiving a selection of a field of the data record associated with the value from a plurality of fields of the data record. The operations of 1110 may be performed in accordance with examples as disclosed herein. In some examples, aspects of the operations of 1110 may be performed by a value component 730 as described with reference to FIG. 7.

At 1115, the method may include querying, based at least in part on the received indication to activate the in-line view, the external data platform for a value corresponding to the data record, wherein the value is queried based at least in part on receiving the selection of the field. The operations of 1115 may be performed in accordance with examples as disclosed herein. In some examples, aspects of the operations of 1115 may be performed by a value component 730 as described with reference to FIG. 7.

At 1120, the method may include causing the value to be displayed within the document editing client in an in-line position at which the indication to activate the in-line view is received. The operations of 1120 may be performed in accordance with examples as disclosed herein. In some examples, aspects of the operations of 1120 may be performed by a display component 735 as described with reference to FIG. 7.

A method for data processing is described. The method may include receiving, at a document editing client, an indication to activate an in-line view of a data record from a data platform that is external to the document editing client, querying, based at least in part on the received indication to activate the in-line view, the external data platform for a value corresponding to the data record, and causing the value to be displayed within the document editing client in an in-line position at which the indication to activate the in-line view is received An apparatus for data processing is described. The apparatus may include a processor, memory coupled with the processor, and instructions stored in the memory. The instructions may be executable by the processor to cause the apparatus to receive, at a document editing client, an indication to activate an in-line view of a data record from a data platform that is external to the document editing client, query, based at least in part on the received indication to activate the in-line view, the external data platform for a value corresponding to the data record, and cause the value to be displayed within the document editing client in an in-line position at which the indication to activate the in-line view is received.

Another apparatus for data processing is described. The apparatus may include means for receiving, at a document editing client, an indication to activate an in-line view of a data record from a data platform that is external to the document editing client, means for querying, based at least in part on the received indication to activate the in-line view, the external data platform for a value corresponding to the data record, and means for causing the value to be displayed within the document editing client in an in-line position at which the indication to activate the in-line view is received.

A non-transitory computer-readable medium storing code for data processing is described. The code may include instructions executable by a processor to receive, at a document editing client, an indication to activate an in-line view of a data record from a data platform that is external to the document editing client, query, based at least in part on the received indication to activate the in-line view, the external data platform for a value corresponding to the data record, and cause the value to be displayed within the document editing client in an in-line position at which the indication to activate the in-line view is received.

Some examples of the method, apparatuses, and non-transitory computer-readable medium described herein may further include operations, features, means, or instructions for querying, based at least in part on the received indication to activate the in-line view, the external data platform for a set of objects associated with a tenant corresponding to the document editing client, causing an indication of the set of objects to be displayed for selection at the document editing client, and receiving, based at least in part on causing the indication of the set of objects to be displayed, a selection of the data record that corresponds an object of the set of objects, wherein the value corresponding to the data record may be is displayed based at least in part on receiving the selection of the data record.

Some examples of the method, apparatuses, and non-transitory computer-readable medium described herein may further include operations, features, means, or instructions for receiving a selection of a field of the data record associated with the value from a plurality of fields of the data record, wherein the value may be queried based at least in part on receiving the selection of the field.

Some examples of the method, apparatuses, and non-transitory computer-readable medium described herein may further include operations, features, means, or instructions for receiving, at the document editing client, an input comprising a new value for the data record and querying, based at least in part on receiving the input comprising the new value, the external data platform to update the value of the data record at the external data platform to the new value.

In some examples of the method, apparatuses, and non-transitory computer-readable medium described herein, causing the value to be displayed within the document editing client may include operations, features, means, or instructions for causing the value to be displayed without a record title corresponding to the data record, without additional information corresponding to the data record, or both.

In some examples of the method, apparatuses, and non-transitory computer-readable medium described herein, causing the value to be displayed within the document editing client may include operations, features, means, or instructions for causing a spreadsheet interface with one or more fields to be displayed, wherein the value may be a field of the one or more fields within the spreadsheet interface.

In some examples of the method, apparatuses, and non-transitory computer-readable medium described herein, the external data platform may be a relational database, a GitHub repository, a data lake, or a combination thereof.

Some examples of the method, apparatuses, and non-transitory computer-readable medium described herein may further include operations, features, means, or instructions for receiving, at the document editing client, a selection of an external data platform of a plurality of external data platforms associated with the document editing client, wherein the external data platform may be queried for the value based at least in part on receiving the selection of the external data platform.

In some examples of the method, apparatuses, and non-transitory computer-readable medium described herein, the document editing client may be supported by tenant instance of a multi-tenant system and the external data platform may be linked to the document editing client by the tenant instance of the multi-tenant system.

In some examples of the method, apparatuses, and non-transitory computer-readable medium described herein, the in-line view corresponds to a view of the value within a line of plain text.

In some examples of the method, apparatuses, and non-transitory computer-readable medium described herein, querying the external data platform may include operations, features, means, or instructions for transmitting, to the external data platform, an application programming interface request.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, at a document editing client corresponding to a tenant of a plurality of tenants, an indication to activate an in-line view of a data record within a document of the document editing client, wherein the data record corresponds to an object of a set of objects associated with the tenant;

receiving, via a first user interface that is displayed within the document of the document editing client, in response to receiving the indication to activate the in-line view of the data record, and that comprises an indication of a plurality of data platforms that are external to the document editing client, a first selection of a first data platform from the plurality of data platforms;

querying, in response to receiving the first selection of the first data platform, the first data platform for the set of objects associated with the tenant corresponding to the document editing client, wherein the first data platform stores objects associated with the plurality of tenants;

causing, in response to receiving the first selection of the first data platform, a second user interface to be displayed within the document of the document editing client, wherein the second user interface displays an indication of the set of objects associated with the tenant for selection within the document of the document editing client;

receiving, via the second user interface and based at least in part on causing the second user interface to be displayed, a second selection of the data record that corresponds to the object of the set of objects associated with the tenant;

querying, based at least in part on receiving the second selection of the data record that corresponds to the object, the first data platform for a value corresponding to the data record from the first data platform, wherein the value corresponding to the data record that corresponds to the object is associated with the tenant; and causing the value to be displayed within the document of the document editing client in an in-line position at which the indication to activate the in-line view is received.

2. The method of claim 1, further comprising:

receiving, via a third user interface that is displayed within the document and in response to receiving the indication to activate the in-line view of the data record, a selection of a field of the data record associated with the value from a plurality of fields of the data record, wherein the value is queried based at least in part on receiving the selection of the field.

3. The method of claim 1, further comprising:

receiving, via a third user interface that is displayed within the document of the document editing client and in response receiving the indication to activate the in-line view of the data record, an input comprising a new value for the data record; and querying, based at least in part on receiving the input comprising the new value, the first data platform to update the value of the data record at the first data platform to the new value.

4. The method of claim 1, wherein causing the value to be displayed within the document of the document editing client comprises:

causing the value to be displayed without a record title corresponding to the data record, without additional information corresponding to the data record, or both.

5. The method of claim 1, wherein causing the value to be displayed within the document of the document editing client comprises:

causing a spreadsheet interface with one or more fields to be displayed, wherein the value is a field of the one or more fields within the spreadsheet interface.

6. The method of claim 1, wherein the first data platform is a relational database, a GitHub repository, a data lake, or a combination thereof.

7. The method of claim 1, wherein the document editing client is supported by a tenant instance of a multi-tenant system associated with the tenant of the plurality of tenants and the first data platform is linked to the document editing client by the tenant instance of the multi-tenant system.

8. The method of claim 1 wherein the in-line view corresponds to a view of the value within a line of plain text.

9. The method of claim 1, wherein querying the first data platform comprises:

transmitting, to the first data platform, an application programming interface request.

10. The method of claim 1, wherein the document editing client is a web-based client comprising one or more user interfaces.

11. An apparatus for data processing, comprising:

one or more processors;

one or more memories coupled with the one or more processors; and instructions stored in the one or more memories and executable by the one or more processors to cause the apparatus to:

receive, at a document editing client corresponding to a tenant of a plurality of tenants, an indication to activate an in-line view of a data record within a document of the document editing client, wherein the data record corresponds to an object of a set of objects associated with the tenant;

receive, via a first user interface that is displayed within the document of the document editing client, in response to receiving the indication to activate the in-line view of the data record, and that comprises an indication of a plurality of data platforms that are external to the document editing client, a first selection of a first data platform from the plurality of data platforms;

query, in response to receiving the first selection of the first data platform, the first data platform for the set of objects associated with the tenant corresponding to the document editing client, wherein the first data platform stores objects associated with the plurality of tenants;

cause, in response to receiving the first selection of the first data platform, a second user interface to be displayed within the document of the document editing client, wherein the second user interface displays an indication of the set of objects associated with the tenant for selection within the document of the document editing client;

receive, via the second user interface and based at least in part on causing the second user interface to be displayed, a second selection of the data record that corresponds to the object of the set of objects associated with the tenant;

query, based at least in part on receiving the second selection of the data record that corresponds to the object, the first data platform for a value corresponding to the data record from the first data platform, wherein the value corresponding to the data record that corresponds to the object is associated with the tenant; and cause the value to be displayed within the document of the document editing client in an in-line position at which the indication to activate the in-line view is received.

12. The apparatus of claim 11, wherein the instructions are further executable by the one or more processors to cause the apparatus to:

receive, via a third user interface that is displayed within the document and in response to receiving the indication to activate the in-line view of the data record, a selection of a field of the data record associated with the value from a plurality of fields of the data record, wherein the value is queried based at least in part on receiving the selection of the field.

13. The apparatus of claim 11, wherein the instructions are further executable by the one or more processors to cause the apparatus to:

receive, via a third user interface that is displayed within the document of the document editing client and in response to receiving the indication to activate the in-line view of the data record, an input comprising a new value for the data record; and query, based at least in part on receiving the input comprising the new value, the first data platform to update the value of the data record at the first data platform to the new value.

14. The apparatus of claim 11, wherein the instructions to cause the value to be displayed within the document of the document editing client are executable by the one or more processors to cause the apparatus to:

cause the value to be displayed without a record title corresponding to the data record, without additional information corresponding to the data record, or both.

15. The apparatus of claim 11, wherein the instructions to cause the value to be displayed within the document of the document editing client are executable by the one or more processors to cause the apparatus to:

cause a spreadsheet interface with one or more fields to be displayed, wherein the value is a field of the one or more fields within the spreadsheet interface.

16. A non-transitory computer-readable medium storing code for data processing, the code comprising instructions executable by one or more processors to:

receive, at a document editing client corresponding to a tenant of a plurality of tenants, an indication to activate an in-line view of a data record within a document of the document editing client, wherein the data record corresponds to an object of a set of objects associated with the tenant;

receive, via a first user interface that is displayed within the document of the document editing client, in response to receiving the indication to activate the in-line view of the data record, and that comprises an indication of a plurality of data platforms that are external to the document editing client, a first selection of a first data platform from the plurality of data platforms;

query, in response to receiving the first selection of the first data platform, the first data platform for the set of objects associated with the tenant corresponding to the document editing client, wherein the first data platform stores objects associated with the plurality of tenants;

cause, in response to receiving the first selection of the first data platform, a second user interface to be displayed within the document of the document editing client, wherein the second user interface displays an indication of the set of objects associated with the tenant for selection within the document of the document editing client;

receive, via the second user interface and based at least in part on causing the second user interface to be displayed, a second selection of the data record that corresponds to the object of the set of objects associated with the tenant;

query, based at least in part on receiving the second selection of the data record that corresponds to the object, the first data platform for a value corresponding to the data record from the first data platform, wherein the value corresponding to the data record that corresponds to the object is associated with the tenant; and cause the value to be displayed within the document of the document editing client in an in-line position at which the indication to activate the in-line view is received.

* * * * *